May 18, 1954  C. W. BOPP  2,678,638
FLUID STOP FOR FLUID MOTORS
Filed Nov. 1, 1948  4 Sheets-Sheet 1
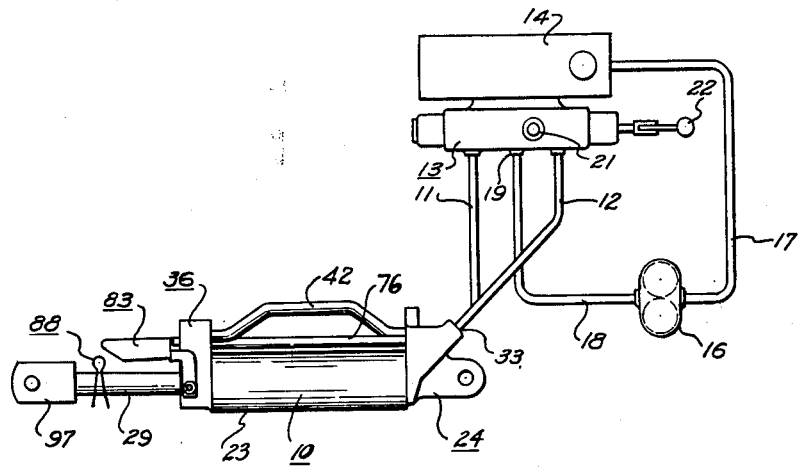
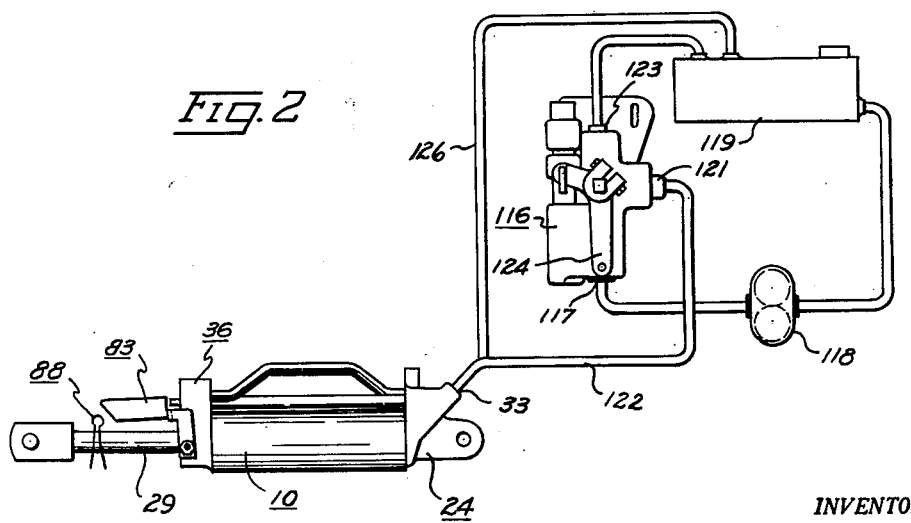
INVENTOR.
CECIL W. BOPP
BY R. Donald Pitts
AGENT.

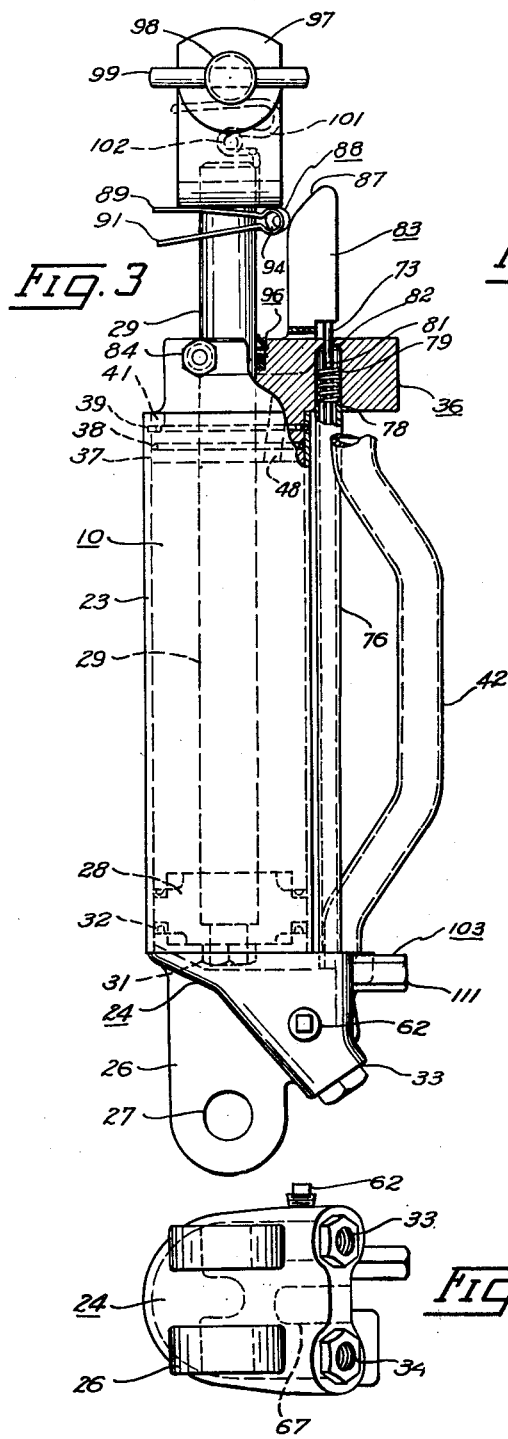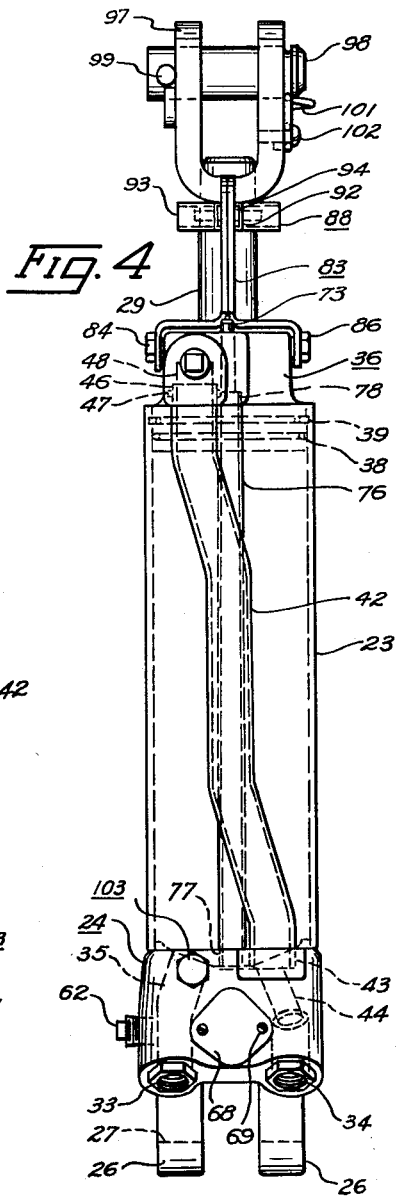

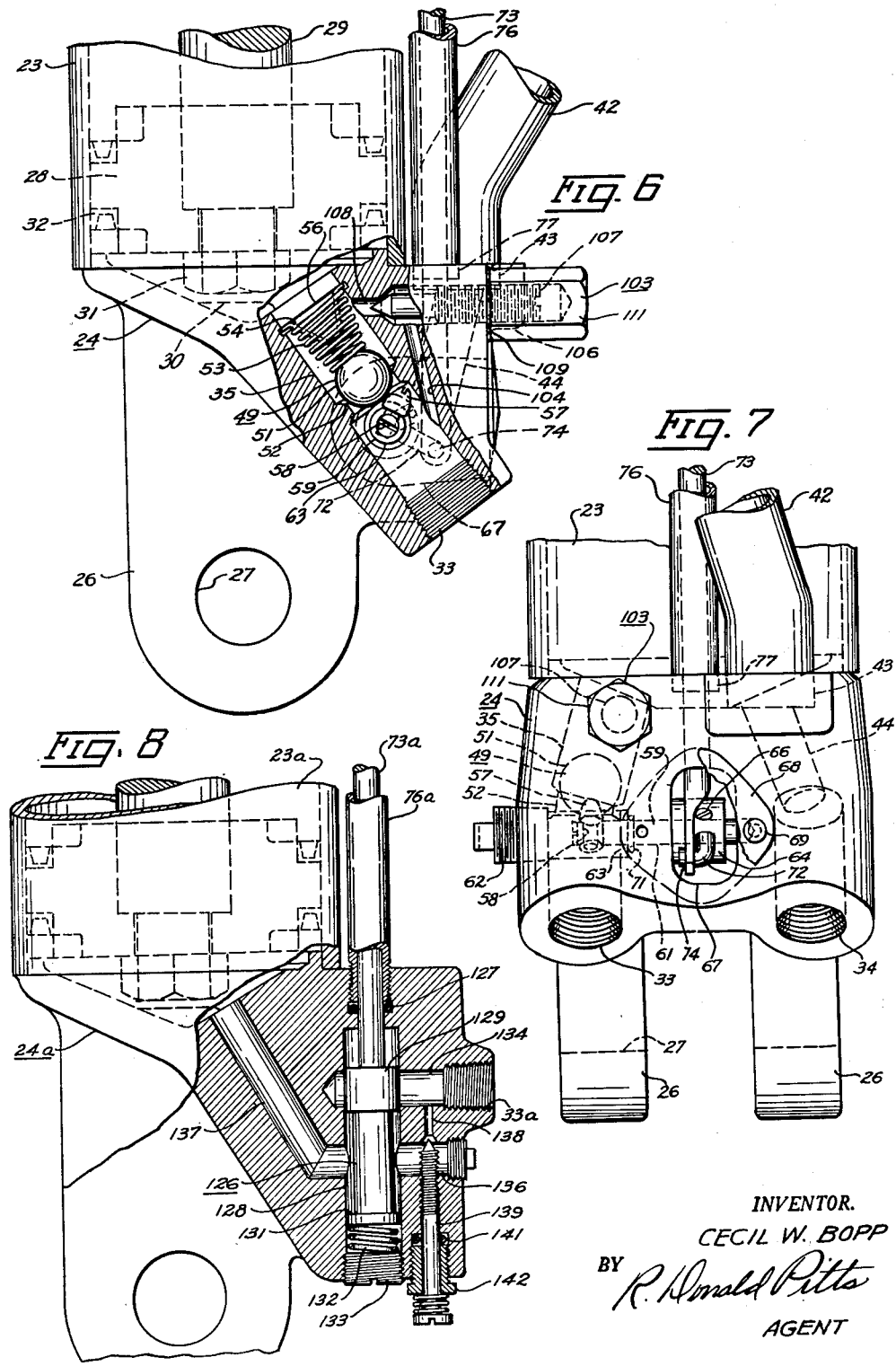

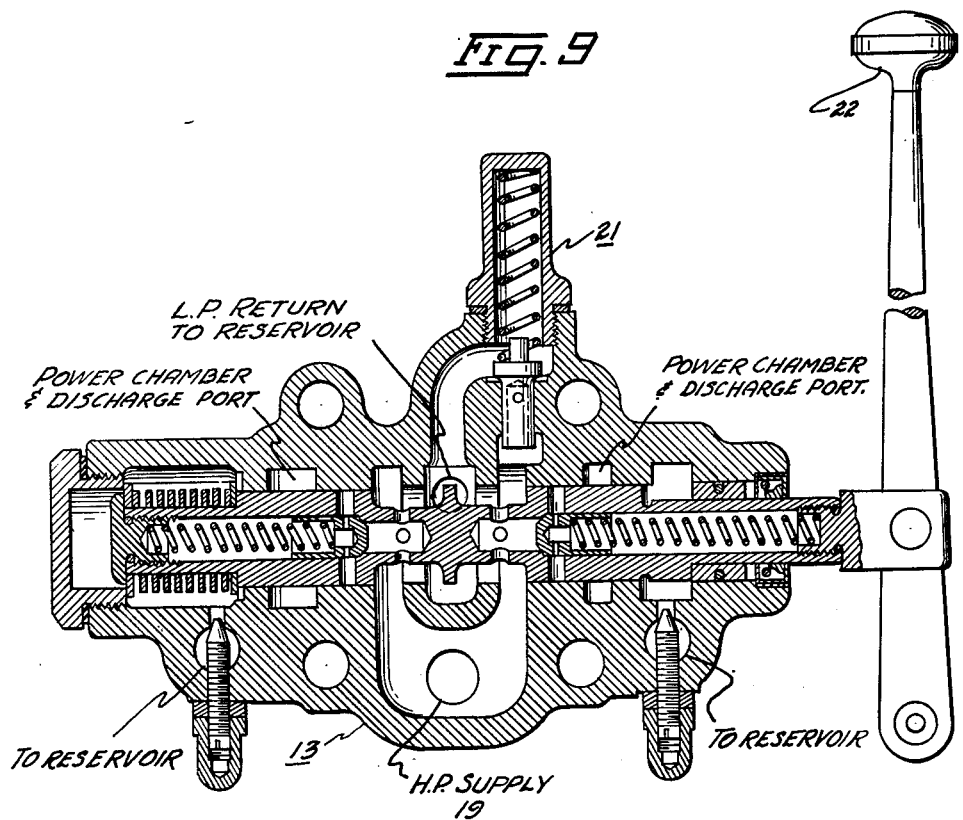

UNITED STATES PATENT OFFICE 2,678,638

FLUID STOP FOR FLUID MOTORS

Cecil W. Bopp, Waterloo, Iowa

Application November 1, 1948, Serial No. 57,799

9 Claims. (Cl. 121—38)

The present invention relates to fluid motors, hydraulic cylinders and the like, and more particularly to improved means for controlling such devices.

Soil tillage and cultivating implements or tools are commonly operated at some predetermined working adjustment in accordance with the depth to which it is desired to plow, till or cultivate the soil, as determined by soil hardness, soil moisture, ease of working tool penetration, etc. Likewise, harvesting machines such as binders, headers, combines, windrowers, and the like, are operated at some height above the ground, the height being determined by conditions such as the height of the grain, or its standing condition. Adjustment of the working elements of such devices is usually made by means of fluid motors, the adjustment being gauged in relation to some gauging means, such as the tractor wheels in the case of implements mounted and carried on the tractor itself, or the usual carrying or gauging wheels, runners, or slides in the case of independently mounted or drawn implements. Such implements are usually lifted from the ground upon reaching the ends of rows, furrows, or fields for turning or for transport or otherwise.

It is desirable that each time the implements are caused to re-enter the work or ground, they automatically assume the same working position as that previously employed. Although the operator of such equipment as has been available in the past, may attain some reasonable approximation of the position by visual judgment, it is both troublesome and time consuming. The desirability of an automatic means of returning an implement to a pre-selected, normal working position is generally acknowledged.

Soil conditions, such as soft spots (sandy, marshy or wet) and hard spots (hard clay spots, unworked plow sole, driveways, etc.) cause the working depth of a tillage implement to vary from the normal or predetermined point. This makes it desirable to be able to readily adjust or position the hydraulic cylinder elements on such implements, and thereby adjust the relationship between the soil working and depth gauging means, to attain any desired working depth as may be required by varying soil conditions.

Let us consider a grain drill working in a sandy field containing hard spots. With the working depth of the furrow opener adjusted for the sandy conditions, it will raise from the ground when any hard spot is encountered, with the result that the seed will not be planted deeply enough. In the case of a plow, as it comes upon a soft spot, the gauge wheels sink in and the shares and the mould boards penetrate too deeply. This frequently turns up hard soil lacking in humus, and decreases the fertility of the field at this point. Again, should the plow share strike a hard spot, it will tend to come out of the ground and plow shallower. In this case, it is desirable to raise the gauging means with respect to the soil working means, so that the support of the implement weight will be shifted to the soil working means and result in greater penetration.

The requirement for variable working position is ever present and for the attainment of satisfactory operational results, the necessary adjustment must be promptly and effectively made. Such adjustments are of two distinct types, and their functional characteristics should be distinguished. First are those which may be thought of as temporary adjustments generally affecting the operation of the device during a single working cycle only. Second are those adjustments of a continuing or repetitive nature such as are effected by a change in the positional relationship of the automatic stopping means. Such changes in the position of the automatic stop subsequently operate to effect automatic restraint of the external movement of the fluid motor at the newly predetermined point until subsequently further changed by the operator. In the interest of the operator's convenience and efficiency, all such adjustments, including those of both types, should be made from the driver's seat position on the tractor.

Hydraulic cylinders are now commercially available with both hydraulic and mechanical stops, but to my knowledge, such stops, when integral with the cylinder, are adjustable only at the cylinder, whereas operator convenience and operational efficiency require that after having automatically come to a predetermined working depth, the cylinder should be capable of further movement to carry the implement to a lower or deeper working position when desirable or necessary, and controlled at all times from the operator's position on the tractor. From time to time, as variable soil and plant conditions require, it becomes desirable to change the position of the automatic stopping means, so that all subsequent cycles of fluid motor operation are restrained at the desired new or altered position. It is equally desirable, from the standpoint of operator's convenience and efficiency, that adjustments of this nature be likewise effected from the operator's position on the tractor.

It is also desirable to effect full lifting and lowering at a rapid rate of cylinder piston travel, but it is preferable that any adjustment in implement working depth be made at a reduced rate of travel to afford the operator time to judge the extent of adjusting movement and to avoid "over-shooting" the mark and the necessity of backing out.

While the requirements for a controlled stop are usually imposed upon the lowering movement of the hydraulic piston, certain implements such as land levelers, dump trucks, and similar equipment, can employ to advantage a stop on their lifting stroke. Under certain conditions, it may be desirable to use such a stop means to limit the piston travel on both the extending and retracting strokes.

Such control is best established with a control valve having a control handle which automatically returns to neutral when the fluid motor reaches the end of its normal stroke. This may be accomplished in connection with a single action jack, for example, by a means responsive to the increased pressure built up by the pump on the completion of the motor movement, and which forcefully returns the valve to the neutral and holding position. Such a valve is shown in Patent No. 1,940,508 granted to R. V. Proctor—December 19, 1933, or Patent No. 2,340,474 granted to Jay D. Johnson, February 1, 1944.

Another way of attaining this objective consists of restraining the valve in its operating position by the flow of oil returning from the cylinder. When such flow is reduced or ceases, the valve returns to its neutral and holding position, through the action of suitable "centering springs." Such a control is exemplified by Patent No. 2,448,557 granted September 7, 1948, to W. T. Stephens.

One of the principal objects of my invention is the provision of a novel means and method of stopping the movement of a fluid motor by shutting off the flow of fluid under pressure from the pump to the motor, and trapping fluid within the motor to preclude further movement.

Another main object of my invention is to provide an adjustable fluid stop integral with a double acting fluid motor or hydraulic jack and cooperative with a remotely positioned double acting valve therefor, which will stop and lock the operation of the motor at a predetermined point, but which allows for further traverse in one or in either direction at either full or reduced speed, subject to the control of operator.

Still another object of the invention is to provide a fluid stop integral with a single acting fluid motor and cooperative with a single acting valve therefor, which will arrest the operation of the motor at a predetermined point, but which allows for further traverse in its lowering direction at a reduced speed, reactive to the load imposed externally upon the motor and in the opposite (raising) direction, reactive to pump pressure, both subject to the control of the operator.

Another object of the invention is to reduce the inertia forces imposed upon the operating mechanism of a fluid motor by gradually restricting the outlet of fluid from the motor as it comes to rest under load.

A still further object of my invention is to provide a means, in addition to any means provided by the main control valve, for limiting the operation rate of the fluid motor during that portion of its travel, subsequent to the operation of an automatic stop means when increment adjustment, rather than rapid traverse of the implement, is desired.

A further object of my invention is the provision in a hydraulic motor of an improved adjustable stop adapted to be actuated by movement of working elements of the motor and operable, in turn, to actuate a hydraulic stop mechanism at any pre-selected position of the working elements, the adjustable stop being further characterized by the ability to be remotely adjusted by the operator, through continued manual manipulation of the motor itself during over-travel or during a portion of its travel or stroke subsequent to or beyond the limits of its normal working stroke.

A still further object of my invention is to provide a restraining means for a fluid motor, actuated by a flexible stop member embracing some moving element of said motor, such as the piston rod of a hydraulic cylinder, and which may be adjusted from the operator's seat on the tractor, using no means other than those provided for the manual operation of the valve normally used to control the cyclic raising, lowering the adjusting of the fluid motor.

A further object of my invention is to provide a hydraulic stopping means for a fluid motor, subject to adjustment from the operator's seat, with which the raising or extending movement of the motor takes place at full normal working speed throughout its entire length or stroke.

Other and further features and objects of the invention will be more apparent to those skilled in the art upon a consideration of the accompanying drawings and the following specifications, wherein are disclosed exemplary embodiments of the invention, with the understanding, however, that such changes may be made therein as fall within the scope of the appended claims, without departing from the spirit of the invention.

In said drawings:

Figure 1 is a general view in side elevation of a double-acting hydraulic cylinder embodying the principles of my invention, and illustrating somewhat schematically, an exemplary fluid pressure supply and control system.

Figure 2 illustrates a fluid pressure supply and control system adapted to operate my improved hydraulic cylinder as a single-acting jack.

Figure 3 is a view in side elevation of my improved hydraulic cylinder with portions thereof broken away to better illustrate the structure.

Figure 4 is a view in top elevation of the structure shown in Figure 3.

Figure 5 is a view in end elevation of the device illustrated in Figure 3.

Figure 6 is an enlarged, fragmentary view in side elevation illustrating a portion of the hydraulic stop mechanism.

Figure 7 is a view in top elevation of the portion of the device shown in Figure 6.

Figure 8 is a fragmentary view, partly in section, illustrating a modified form of the hydraulic stop and by-pass valve mechanism, and Figure 9 is a vertical longitudinal section taken through a double-acting control valve adapted for use with my improved hydraulic control system.

Referring now to the drawings, and particularly to Figure 1 thereof, in which the fluid motor or hydraulic jack is indicated generally at 10. The jack is arranged for double action and fluid pressure may be selectively applied to either side of the jack's piston through flexible conduits 11 or 12. The double acting control valve 13, to the discharge ports of which the conduits 11 and 12 are connected, is of a type exemplified by Patent No. 2,448,557 granted September 7, 1948 to W. T. Stephens. Figure 9 of the drawings illustrates the workings of such a valve as an aid toward a proper understanding of the present invention.

Fluid is circulated from the reservoir 14 by the pump 16, under pressure, through conduits 17 and 18 to the inlet port 19 of the valve 13. Pressure adjusting means 21 provides for overpressure relief back to the reservoir 14. The operating handle 22 may be manipulated to direct the flow of fluid under pressure against either the bottom or the top of the hydraulic cylinder's piston to cause it to either raise or lower, or to return the fluid directly back to the reservoir 14. Application of fluid pressure to one end of the jack results in discharge of fluid from the opposite end of the jack through the connected conduit, 11 or 12 as the case may be.

The operating handle 22, when manually set in either lifting or lowering position, will automatically return itself to neutral position in response to a predetermined pressure drop in the return line. Such a control valve will function in this manner when used in connection with the conventional type of hydraulic cylinder employing a mechanical stop.

The improved hydraulic jack or fluid motor embodying my inventive idea and which will now be described in detail, incorporates, as an integral part of the jack, means whereby a fluid pressure drop in the return line, sufficient to cause automatic closure of the control valve 13, may be accomplished at any predetermined point of the piston's travel. Movement of the hydraulic jack piston is stopped upon closure of the control valve and increment adjustment of the piston is accomplished, at reduced speed, through further manual manipulation of the control handle.

Referring now to Figures 3 and 4 in particular; the tube or cylinder 23 is integrally secured, as by welding or brazing, to the head 24 which will hereinafter be referred to as the lower head. Suitable clevis members 26, having aligned pin holes 27, are provided for pivotally mounting the jack.

Operating within the cylinder 23 is a piston 28 secured on the end of piston rod 29 by means of a nut 31, the piston having packing cups 32 in accordance with common practice. The cylinder head 24 is provided with two ports 33 and 34, both threaded to receive the male couplings, not shown, of the flexible conduits 11 and 12. The open end of the cylinder 23 is provided with an upper head 36 having a portion 37 thereof fitted within the end of the cylinder, sealed thereto by means of an O ring 38 and secured therein against axial movement by means of the snap ring 39. A recess in the side of the head permits the snap ring to be contracted for removal of the head 36.

A rigid offset tube 42 is welded, brazed, or otherwise secured at one end thereof to the lower head 24, the tube preferably entering a socket 43, a passage 44 providing a means of communication with the port 34. The opposite end of tube 42 is received in a socket 46 in the upper head and sealed against leakage around its periphery by the O ring 47. A passage 48 extends between the socket 46 and the fluid space within the rod end or "upper" end of the cylinder. Thus fluid under pressure may flow from the flexible conduit 11 through the port 34, through passage 44, tube 42, and passage 48 into the fluid space within the upper end of the cylinder, between the piston 28 and the upper head 36.

It will be noted that the shape and arrangement of the tube 42 is such as to form a convenient carrying handle for the entire jack unit.

Fluid may, alternatively, be pumped through conduit 12, the port 33, and passage 35, into the fluid space within the lower end of the cylinder. The port 33 is provided with an integral return-check valve indicated generally at 49 and comprising a ball 51 biased against the ball seat 52 by a light coil spring 53. The ends of the elongated, generally V-shaped spring retainer and ball stop 54 snap into the retainer groove 56.

The return check valve 49 is normally held in depressed or open position by a check valve actuating means including an acorn-shaped, camlike member 57. The stem 58 of the cam is threadedly received in a hole drilled transversely of the end of the cam shaft 59. The cam shaft is journalled in a transversely extending bore 61 sealed at its outer end by the plug 62, and the shaft is secured against axial movement by means of a shoulder 63 and a collar 64, the latter being removably mounted on the shaft and secured by the set screw 66. The collar 64 is received within a pocket 67 in the head and a cover 68 for the pocket is secured by screws 69.

Leakage past the cam shaft is prevented by pressure of the shoulder 63 against a resilient O ring 71 recessed in the bore 61.

A crank arm 72, extending radially from the collar 64, is pivotally engaged in the end of push rod 73 which is flattened and apertured, as at 74, for its reception. The push rod is slideably mounted within and protected by tube 76, the ends of which member are received in sockets 77 and 78 in the lower and upper heads respectively. A compression spring 79, encircling the push rod within the socket 78, is engaged at one end by the end of the tube 76 and at the other end by a pin 81 in the push rod. Thus the push rod, under the action of this spring 79, is normally biased axially, outwardly through an opening 82 in the upper head, and the cam 57 is caused to rotate toward the ball check 51 to lift it from its seat.

The bifurcated stop lever 83, supported by and rotatable on pivot bolts 84 and 86, engages the free end of push rod 73. The outer end of the stop lever has an inclined ramp face 87, best illustrated in Figure 3, adapted to be contacted and forced outwardly by an adjustable stop 88 slideably received on the piston rod 29.

The adjustable stop 88 is preferably formed of flat spring material with divergent resilient leg portions 89 and 91, both leg portions being apertured for reception over the piston rod. A rectangular cut-away section 92 in the bent over portion 93 is provided for the rotatable mounting of the roller 94. The ends of the resilient legs may be pinched together to permit the stop to be moved along the piston rod to any desired position.

The lengths of the cylinder and the piston rod are so proportioned that, on the return stroke of the piston, movement of that member toward the lower head 24 is restrained by contact between the end of the piston rod 29 against an appropriate boss or pad 39 integral with or secured to the head 24. In this position, and when the stop 88 bears against the yoke 97, clearance remains between the resilient leg 91 of stop member 88 and all parts of the upper head 36. In this way, overloading or pinching of the stop member 88 is avoided. When the stop is spaced away from the yoke 97, retracting movement of the piston 28, as it approaches lower head 24, operates first to engage the stop 88 with the ramp section of stop lever 83, effecting gradual closing of ball 51 against its seat 52. Further movement of the stop 88 toward the upper head effects no further movement of any operational element relating to operation of the ball valve 51. When the inner leg 91 of stop 88 contacts head 36, it is compressed against its own elasticity toward leg 89, whereby the grip of stop 88 on the piston rod 29 is loosened and relative sliding between the two may occur without damage to either, and may be continued under the full control of the operator until piston 28 reaches the end of its stroke and further movement is restrained by contact between the end of piston rod 29 and the stop pad 30. This serves at once to prevent damage to the resilient stop 88 should over-travel of the piston beyond the setting of the stop occur through inadvertence or carelessness, and to provide a means whereby the stop 88 may be selectively adjusted axially along the piston rod to a new working position, at the will of the operator, and from his operating position on the tractor.

The upper head 36 is sealed against leakage around the piston shaft by means of conventional V packing, a snap ring and a wiper ring, as indicated generally at 96. A clevis 97, secured to the outer end of the piston rod, is provided with attachment pin 98 secured in place with the pin 99 and a spring retainer 101, the latter member being attached to the clevis by screw 102.

A bleeder or by-pass means, whereby fluid may be conducted directly from the port 33 into the lower cylinder space, is indicated at 103, Figure 6. The fluid by-pass passage 104 connects, at its outer end, with the main port 33 and, at its inner end, with the tapped hole 106, and the lower end of which provides a seat for the needle valve stem 107 threadedly received therein. Passage 108, leading from the by-pass valve, intercepts the passage 35. Thus the flow of fluid through the bleeder passages to by-pass the check valve 49, is adjustably controlled by the position of the needle valve stem 107. A fluid-tight seal around the valve stem is maintained by the metallic gasket 109 and cap nut 111.

The operation of my improved jack, when subject to the control of a double acting valve as described in connection with Figure 1, will now be discussed; assuming that the load is to be raised on the extending stroke of the piston and that, initially, the piston is in retracted or lowered position, as in Figures 3 and 4, and that the stop 88 is positioned as in Figure 1.

Assuming, further, that control lever 22 is moved to "raising" position, fluid is caused to flow, under pressure, through flexible hose 12 to the port 33, past the ball check 49 and into the cylinder below the piston. A small amount of fluid also passes through the by-pass valve 107. The control valve 13 remains in "raising" position, unless manually moved, until the piston reaches the upper limit of its stroke at which time fluid will cease to flow from the upper portion of the cylinder back to the control valve 13 through the tube 42, passage 44, port 34 and hose 11. Due to the pressure drop in this return line, the control valve 13 is automatically returned, by means of centering springs, to neutral position, as described in Patent 2,448,557, and hydraulically locks the piston in extended position.

The ball check, upon being lifted from its seat by fluid entering the cylinder during the "raising" stroke, is closely followed by the cam 57 as a result of the pressure of spring 79 (Figure 3) on the push rod 73. This cam continues to hold the check valve in open position to permit free passage of fluid in either direction.

Lowering of the jack is accomplished by moving the control lever 22 of the main control valve 13 to "lowering" position. Fluid will be forced through hose 11, port 34, 44, and tube 42 and into the upper portion of the cylinder, thus causing the piston to lower and force the fluid in the lower end of cylinder out through the open check valve and back through the control valve to the reservoir 14.

However, at the point at which the pre-positioned stop 88 contacts the inclined face 87 of the stop lever 83, the stop lever is forced outwardly and downwardly against the push rod 73, resulting in rotation of the cam 57 and a gradual closing of the return check valve 49. Downward movement of the piston and its load is thus gradually arrested and the rate at which the piston may be moved the remainder of its stroke, whatever that may be, is determined by the setting of the by-pass valve 107.

The flow of fluid through the by-pass valve, however, is not enough to maintain sufficient pressure in the return line to hold the control valve 13 in "lowering" position against the action of the centering springs; and that member automatically returns to neutral. Further movement, in a lowering direction, may be had, at a rate determined by the setting of the by-pass valve, upon manually holding the control lever 22 of the valve 13 in "lowering" position.

As previously explained, any movement of piston 28 toward lower head 24 subsequent to the contact of resilient leg 91 with upper head 36 results in relative movement of leg 91 toward leg 89. This in turn releases the grip of stop member 88 on the piston rod and permits relative movement between the two without damage. This performs two functions: first, it provides a safety measure to preclude damage to parts of the mechanism should the operator, through carelessness or accident, allow over-travel of the motor beyond the limit established by the setting of the stop. Second, it allows the position of the stop 88 to be adjusted along the piston rod by means of intentional over-travel under full control of the operator, so as to increase the effective length of movement or the working stroke of the motor.

In the event that the working stroke is adjusted to any length less than its full or maximum travel, the stop 88 will be positioned at some intermediate point along the piston rod and spaced from the yoke 97. Adjustment to increase the effective length of the working stroke, and thereby the position at which lowering movement of the piston is automatically restrained, is accomplished by holding the manual control 22 of valve 13 in its "lowering" position after the piston is automatically restrained through the operation of the adjustable stop 88 and the hydraulic stop mechanism previously described. This results in first bringing the leg 91 into contact with a stop-release portion of the upper head 36 causing the stop to be released and to slide along the piston rod toward the yoke 97. It is evident, therefore, that the lower working position of piston 28 is altered by the amount by which resilient stop 88 is moved along the piston rod. All subsequent lowering movements of the piston within the cylinder will be automatically determined by the altered position of stop 88.

Raising of the jack may be accomplished at any time by shifting the control valve 13 to the "raising" position. Raising or extending of the jack will be at normal speed throughout the entire stroke of the piston.

Figure 2 represents, more or less schematically, a hydraulic system employing a single acting control valve with which my improved hydraulic jack is adapted for single action operation. As taught by Proctor in Patent No. 1,940,508, the control valve indicated generally at 116, has an inlet port 117 connected to receive fluid supplied under pressure by pump 118 from the reservoir 119. Discharge from the control valve 116 to the port 33 of the jack is through valve port 121 and flexible hose 122, means being provided within the valve for over-pressure relief through the port 123 back to the reservoir. It is preferable that a second flexible hose connection be made between the port 34 of the jack and the reservoir for venting purposes.

The operation of the system is as follows; extending the jack is accomplished by shifting the control lever 124 to "raise" position, resulting in directing fluid under pressure into the lower portion of the cylinder through the port 33. The upper portion of the cylinder is vented, through port 34 and flexible hose 126, into the reservoir 119. Upon the piston's reaching the upper limit of its stroke, the fluid pressure in the cylinder and in the main control valve increases to such a degree that the pressure-responsive shut-off mechanism in the valve returns to neutral position, thus hydraulically locking the piston against further movement.

Shifting of the control lever 124 to "lowering" position creates a free passage for fluid from the lower end of the cylinder back to the reservoir and the fluid is forced back through such passage due to the effect of gravity on the load carried by the cylinder. Upon the piston reaching the point at which the stop 88 engages the ramp face of the check valve actuating means, the ball check is permitted to close gradually to arrest the downward travel of the piston. The piston will, however, continue its downward course, at a rate determined by the setting of the by-pass valve 107, until it reaches the bottom of its stroke or until the main control 116 is manually closed or returned to neutral.

Thus, the change in rate of motion of the piston rod serves as a visual indication to the operator that the stop has been reached. Increment adjustment of the jack downwardly is thus under closer control of the operator.

A positive but gradual stop to limit the piston travel is secured in the case of either the double acting or single acting jack by tightly closing the by-pass valve 107.

In the modified form of stop valve and by-pass mechanism shown in Figure 8, the cylinder 23a has the lower head 24a affixed at its lower end, as described in connection with other figures of the drawings. The lower head 24a incorporates a sliding valve mechanism 126 adapted to control the flow of fluid to or from the lower end of the cylinder. The push rod 73a is slidably received in the tube 76a, the end of the tube being threaded into the head and an O ring 127 provided to seal the push rod against leakage from the bore 128. Enlarged sliding valve portions 129 and 131 near the end of the push rod are slideable in the bore 128, a spring 132 being positioned between the end of the push rod and the plug 133 which closes the end of the bore.

The passage 134, terminating in the threaded port 33a, is transverse to and intercepts the bore 128 and a second transverse passage 136 connects with an angularly positioned passage 137 opening directly into the lower cylinder cavity. Due to the urging of the spring 132, the enlarged valve portion 129 normally occupies the upper end of the bore 128, leaving a free passage for fluid through port 33a, passage 134, bore 128, and passages 136 and 137 into the cylinder.

Upon contact of the adjustable stop 88 with the stop lever 83, the push rod 73a is depressed against the action of spring 132 to move the enlarged sliding valve portion 129 into position to block off the passage 134, thus cutting off the flow of fluid through the valve.

A by-pass passage 138, however, connects passages 134 and 136, a needle valve stem 139 being threadedly received in the head and adapted to regulate the flow of fluid through the by-pass passage. Leakage around the valve stem 139 is prevented by a resilient O ring 141 and a packing nut 142.

The port 34 and passage to the upper cylinder cavity, as well as other structure of the jack, is substantially the same as described in connection with Figures 3 to 7.

Operation of a jack embodying this modified form of hydraulic stop is generally as follows. Assuming the piston is in fully lowered position, as illustrated, the main control valve 13 (Figure 1) is moved to "raise" position and held manually to direct fluid under pressure to the port 33a. Due to the sliding valve 129 obstructing flow from passage 134 into the bore 128, fluid can only pass through the by-pass 138 into the passage 136 and so to the cylinder. Pressure of the fluid will cause the piston to raise, but at a rate determined by the setting of the by-pass valve stem 139. However, as soon as the adjustable stop 88 leaves the stop lever 83, pressure of spring 132 urges sliding valve 129 and the push rod 73A upwardly to permit full flow of fluid to the cylinder and thus full speed for the remainder of the piston up stroke.

Retraction or lowering of the piston is a reverse procedure. The main control valve 13, when moved to "lowering" position, will force fluid into the upper cylinder cavity and cause fluid to be discharged from the lower cylinder cavity through the port 33a and back to the main control.

Upon contact of the adjustable stop 88 with stop lever 83, the push rod 73A and sliding valve 126 are moved downwardly whereby the enlarged portion 129 gradually covers the passage 134 to thereby gradually arrest movement of the piston. The reduced pressure in the return line to the main valve results in automatic return of the valve to its neutral position.

However, manually holding the main valve in "lowering" position will permit fluid to continue flowing through the by-pass passages 136 and 138 and thus permit further downward movement of the piston at a slow rate under complete manual control.

It should be understood that throughout the foregoing specifications and following claims, the words "fluid motor," "hydraulic jack" or "hydraulic cylinder" are used in their broadest sense. It should also be understood that the main control valves shown and described are merely exemplary types and that any suitable valve may be employed.

Although I have shown and described specific embodiments of my invention, the principles involved are susceptible of numerous other applications that will occur to persons skilled in the art. The invention is, therefore, to be limited only as indicated by the scope of the appended claims.

I claim as my invention:

1. The combination with a fluid pressure supply means, a control valve having an inlet port, first and second outlet ports optionally useable as discharge and return ports or return and discharge ports respectively, and pressure responsive means adapted to automatically return the control valve to a neutral position, of a hydraulic jack having a piston and piston rod mounted for reciprocation therein, upper and lower ports in communication with the interior of the jack at points respectively above and below the said piston, a return-check valve in the said lower port arranged to close against flow of fluid therethrough from the jack, return-check valve actuating means normally holding said return-check vlave in open position, stop means adjustably mounted on the piston rod and operatively engageable with the check valve actuating means to disengage the check valve, a bleeder valve connected to by-pass the said check valve, and conduits connecting the first and second outlet ports and the upper and lower ports respectively.

2. For use in a hydraulic jack including a cylinder, a piston and piston rod, a fluid pressure port in communication with the cylinder at one end thereof, valve means in the said port, and valve actuating means operatively connected therewith; a stop adjustably mounted on the piston rod and engageable, at a predetermined point in the stroke of the piston rod, with the valve actuating means to thereby operate the valve, the stop comprising a member of spring material formed in generally U-shape to provide a pair of normally divergent flat portions having aligned apertures therein of such size as to closely engage and bind on the piston rod except when the free ends of the said flat portions are forced one toward the other to permit sliding adjustment along the piston rod and a stop release engageable, at a predetermined point in the travel of the piston rod, with one of the free ends of the said stop.

3. The combination with a fluid pressure supply means, a control valve having an inlet port, first and second outlet ports optionally usable as discharge and return ports or return and discharge ports respectively, and pressure responsive means adapted to automatically return the control valve to neutral position; of a fluid motor with movable means affording external directional movement, a plurality of fluid ports in communication with the interior of the motor such that directional fluid flow through said ports results in corresponding directional external movement of said motor, a return-check valve in one of said ports arranged to reduce the flow of fluid outwardly therethrough from the fluid motor, return-check valve actuating means normally holding said return-check valve in open position, stop means mounted on said fluid motor responsive to external movement of said movable means at a predetermined position thereof, the said stop means being operatively connected with the check valve actuating means to disengage the check valve, a bleeder valve connected to by-pass the said check valve, and conduits connecting the first and second outlet ports and the upper and lower ports respectively.

4. The combination with a fluid pressure supply means, a control valve having an inlet port, first and second outlet ports optionally usable as discharge and return ports or return and discharge ports respectively, and pressure responsive means adapted to automatically return the control valve to neutral position; of a hydraulic jack having a piston and piston rod mounted for reciprocation therein, upper and lower ports in communication with the interior of the jack at points respectively above and below the said piston, a return check valve in the said lower port arranged to close against flow of fluid therethrough from the jack, return check valve actuating means normally holding said return check valve in open position, stop means mounted on the piston rod and operatively engageable with the check valve actuating means to disengage the check valve, conduits connecting the first and second outlet ports and the upper and lower ports respectively, and a bleeder conduit arranged to by-pass the said check valve means.

5. In a fluid motor having a movable external member and means affording directional movement thereof; a fluid pressure port in communication with the interior of said motor, valve means in the said port, valve actuating means operatively connected therewith, a stop adjustably mounted on the movable external member of said fluid motor and engageable, at a selective, pre-determined point in the directional movement of said movable external member, with the valve actuating means to thereby operate the valve, the stop comprising a resilient member formed in generally U shape to provide a pair of normally divergent leg portions having aligned apertures therein of such size as to closely engage and normally bind on the movable external member but adapted to disengage and slide along the said movable external member upon application of pressure to one of said leg portions and stop release means disposed in the path of travel of the said stop so as to effect contact therewith and application of pressure thereto at a pre-determined point in the travel of said external member to thereby effect release of the stop.

6. In a fluid motor having a movable external member and means affording directional movement thereof, a fluid pressure port in communication with the interior of said motor, valve means in the said port, valve actuating means operatively connected therewith, a stop adjustably mounted on the movable external member of said fluid motor and engageable, at a selective pre-determined point in the directional movement of said movable external member, with the valve actuating means to thereby operate the valve, the stop comprising a resilient member formed in generally U shape to provide a pair of normally divergent leg portions having aligned apertures therein of such size as to closely engage and normally bind on the movable external member but adapted to disengage and slide along the said movable external member upon application of pressure to one of said leg portions and a stop release disposed to contact, at a pre-determined point in the travel of the movable external member, one of said leg portions whereby its grip is released upon the movable external member and whereupon it may slide without damage.

7. In a hydraulic jack including a cylinder, a piston and piston rod, a fluid pressure port in communication with the interior of the cylinder at one end thereof, valve means in the said port, valve actuating means operatively connected therewith, a stop adjustably mounted on the piston rod and engageable, at a pre-determined point in the stroke of the piston rod, with the valve actuating means to thereby operate the valve, the stop comprising a member of spring material formed in generally U shape to provide a pair of normally divergent leg portions having aligned apertures therein of such size as to closely engage and bind on the piston rod except when the free ends of the said leg portions are urged together to permit sliding adjustment along the piston rod, a stop release on the jack against which one leg of the stop may be urged by movement of the said piston rod, whereby the grip of said stop upon the piston rod is reduced and relative movement occurs between the said stop and said piston rod.

8. In a fluid motor including a cylinder, a piston slidable therein, a piston rod and upper and lower cylinder heads; a fluid passage embodied in the lower head in communication with the interior of the cylinder, a spring-loaded check valve in the fluid passage arranged to prevent passage of fluid outwardly therethrough from the cylinder, a cam-like member arranged to unseat the check valve, means for actuating the cam-like member, said means including a push rod operatively engaging the cam-like member and extending through aligned openings in the upper and lower heads and means for actuating the push rod comprising a stop member engaged on the piston rod.

9. The combination with a fluid motor having a casing, a movable member disposed therein and responsive to fluid under pressure applied thereto, of primary and secondary passages in communication with the interior of said casing, a port in communication with said passages and alternatively usable for admission of fluid to or exhaustion of fluid from said casing through said passages, valve means cooperative with the primary passage and arranged to normally permit free flow of fluid therethrough, means responsive to movement of the movable member at a pre-determined position thereof arranged to actuate the said valve means to reduce the passage of fluid therethrough whereby further movement of the movable member will be at a reduced rate determined by the flow of fluid through the secondary passage, a manually operable control valve arranged to selectively conduct fluid under pressure to or from the said port and pressure-responsive means in said control valve arranged to automatically close the control valve in response to a pre-determined decrease in pressure of fluid discharged from said port whereby said control valve will be automatically closed upon a drop in fluid pressure caused by closure of the valve means and whereby further operation of the fluid motor will be under manual operation of the control valve but at a rate determined by the flow of fluid through the secondary passage.

References Cited in the file of this patent

UNITED STATES PATENTS

| Number | Name | Date |
| --- | --- | --- |
| 129,269 | Clayton | July 16, 1872 |
| 182,974 | Walsh | Oct. 3, 1876 |
| 610,479 | Ewart | Sept. 6, 1898 |
| 1,659,898 | Simpson | Feb. 21, 1928 |
| 1,714,545 | Burns | May 28, 1929 |
| 1,812,533 | Hunt | June 30, 1931 |
| 1,922,874 | Tymstra | Aug. 15, 1933 |
| 2,210,144 | Day | Aug. 6, 1940 |
| 2,217,752 | Jandus | Oct. 15, 1940 |
| 2,223,792 | Muir | Dec. 3, 1940 |
| 2,383,689 | Silver | Aug. 28, 1945 |
| 2,448,557 | Stephens | Sept. 7, 1948 |
| 2,509,589 | Deardorff | May 30, 1950 |
| 2,591,492 | Anderson | Apr. 1, 1952 |

FOREIGN PATENTS

| Number | Country | Date |
| --- | --- | --- |
| 527,171 | Great Britain | Oct. 3, 1940 |